(12) United States Patent
Voutour et al.

(10) Patent No.: US 10,453,124 B1
(45) Date of Patent: Oct. 22, 2019

(54) ADAPTIVE FINANCIAL ADVISOR

(71) Applicant: United Services Automobile Association (USAA), San Antonio, TX (US)

(72) Inventors: Teddy Joseph Edmond Voutour, Helotes, TX (US); David C. Ault, San Antonio, TX (US); Christina N. Nickel, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 547 days.

(21) Appl. No.: 14/918,211

(22) Filed: Oct. 20, 2015

Related U.S. Application Data

(60) Provisional application No. 62/120,638, filed on Feb. 25, 2015, provisional application No. 62/075,413, filed on Nov. 5, 2014.

(51) Int. Cl.
*G06Q 40/00* (2012.01)

(52) U.S. Cl.
CPC .................. *G06Q 40/00* (2013.01)

(58) Field of Classification Search
CPC ........ G06Q 40/60; G06Q 40/04; G06Q 40/08; G06N 99/005; G06F 21/6218
USPC ............................... 705/35, 36 R; 1/1; 482/4
See application file for complete search history.

(56) References Cited

U.S. PATENT DOCUMENTS

| | | | | |
|---|---|---|---|---|
| 8,635,101 B2 * | 1/2014 | Wright | ................. | G06Q 40/06 705/35 |
| 2008/0046347 A1 * | 2/2008 | Smith | ................... | G06Q 20/14 705/30 |
| 2009/0048957 A1 * | 2/2009 | Celano | ................. | G06Q 40/00 705/35 |
| 2009/0106136 A1 * | 4/2009 | Wright | ................. | G06Q 40/00 705/35 |
| 2014/0136381 A1 * | 5/2014 | Joseph | ................. | G06Q 40/02 705/35 |
| 2014/0136383 A1 * | 5/2014 | Wright | ................. | G06Q 40/00 705/35 |
| 2016/0034932 A1 * | 2/2016 | Sion | .................... | G06Q 20/322 705/14.1 |
| 2016/0103897 A1 * | 4/2016 | Nysewander | ....... | G06F 16/2428 707/602 |
| 2017/0287064 A1 * | 10/2017 | Sion | .................... | G06Q 20/322 |

OTHER PUBLICATIONS

Weill et al. "Managing Investment in Information Technology: Mini Case Examples and Implications" (Mar. 1989),MIS Quarterly, vol. 13, No. 1 pp. 3-17.*

(Continued)

*Primary Examiner* — Kelly S Campen
(74) *Attorney, Agent, or Firm* — Fish & Richardson P.C.

(57) ABSTRACT

Methods, systems, and apparatus, including computer programs encoded on computer storage media, for an adaptive financial system. One of the methods includes receiving, from a user, a selected lifestyle archetype of a user, wherein the selected lifestyle archetype identifies a predetermined allocation of income and spending. The method includes monitoring financial activities of the user. The method also includes providing feedback to the user based on the monitoring and the selected lifestyle archetype.

21 Claims, 10 Drawing Sheets

(56) References Cited

OTHER PUBLICATIONS

Peetz, Johanna "The "Budget Fallacy": Sources of Accuracy and Bias in Personal Spending Predictions" 2010 Dissertation Submitted to the Department of Psychology in partial fulfillment of the requirement for Doctor of Philosophy in Psychology, 2010.*

* cited by examiner

ADAPTIVE FINANCIAL ADVISOR

CROSS-REFERENCE TO RELATED APPLICATIONS

This application claims priority to U.S. Provisional Patent Application 62/075,413, filed on Nov. 5, 2014, entitled "ADAPTIVE FINANCIAL ADVISOR," incorporated herein by reference in its entirety and U.S. Provisional Patent Application 62/120,638, filed on Feb. 25, 2015, entitled "ADAPTIVE FINANCIAL ADVISOR," incorporated herein by reference in its entirety.

BACKGROUND

Individuals create a budget as a finance plan that describes how they will use their income. The budget can allocate income towards expenses, savings, and debt repayment. Generally a budget is created by looking at past spending and projecting that information and spending pattern into the future.

Some individuals fail to create a budget. Some individuals who create a budget fail to allocate their income according to the budget. Individuals spend more than they earn, driving themselves deeper into debt which can requires more of their income to be spent servicing the debt, which in turns leaves less income available.

SUMMARY

In general, one innovative aspect of the subject matter described in this specification can be embodied in methods that include the actions of receiving, from a user, a selected lifestyle archetype of a user, wherein the selected lifestyle archetype identifies a predetermined allocation of income and spending. The methods include the action of monitoring financial activities of the user. The methods also include the action of providing feedback to the user based on the monitoring and selected lifestyle archetype.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the actions of determining an educational need of the user based on the monitoring and then presenting educational material to the user based on the determination. The methods of the financial activities of the user may include a percentage of income that is saved. The methods may include the actions of comparing the financial activities of the user to the financial activities of other users that also selected the selected lifestyle archetype and providing feedback may be further based on the comparison. The methods may include the action of recommending the user open a new financial account based on a comparison of financial accounts of the users and financial accounts common to the other users. The methods may include the action of determining an amount of income available to service debt. Monitoring the financial activities of the user may include monitoring the amount of income used to service debt. Providing feedback may include providing negative feedback if the amount of income used to service debt exceeds the amount of income available to service the debt. The methods may include the actions of comparing the financial activities of the user to a second lifestyle archetype which is different from the user's selected lifestyle archetype, determining that the financial activities of the user more match the second lifestyle archetype, and sending a message asking the user whether they self-identify with the second lifestyle archetype. The lifestyle archetype may identify at least one spending choice that is a voluntary financial decision.

BRIEF DESCRIPTION OF THE DRAWINGS

Like reference numbers and designations in the various drawings indicate like elements.

DETAILED DESCRIPTION

Individuals have a broad range of financial expertise. Some make budgets but many do not. Some individuals live within their means and many do not. Conventional financial advice is often generic and may seem either inapplicable to the user's current situation or would require a monumental shift in the user's behavior that would be difficult to achieve. In some instances, conventional financial advice is ignored because it doesn't take into account the perspective and values of the person receiving the advice.

The delivery of financial advice and therefore the financial performance of individuals can be improved by customizing the advice to suit the individual. Incremental financial advice which encourages the user to take small steps towards a goal can have a greater impact overall than conventional financial advice with substantial changes to the user's habits.

The financial advice can be reinforced by taking into account the values and desires of the user: how do they like to spend their time; where does their disposable income go; if they need to make a sacrifice, what do they give up, etc. In order to facilitate this determination, a user can select a lifestyle archetype that is representative of the way the user likes to live. The user's spending habits can be compared to other users who have the same lifestyle in order to nudge the user towards more sound financial decisions.

Figure 1:
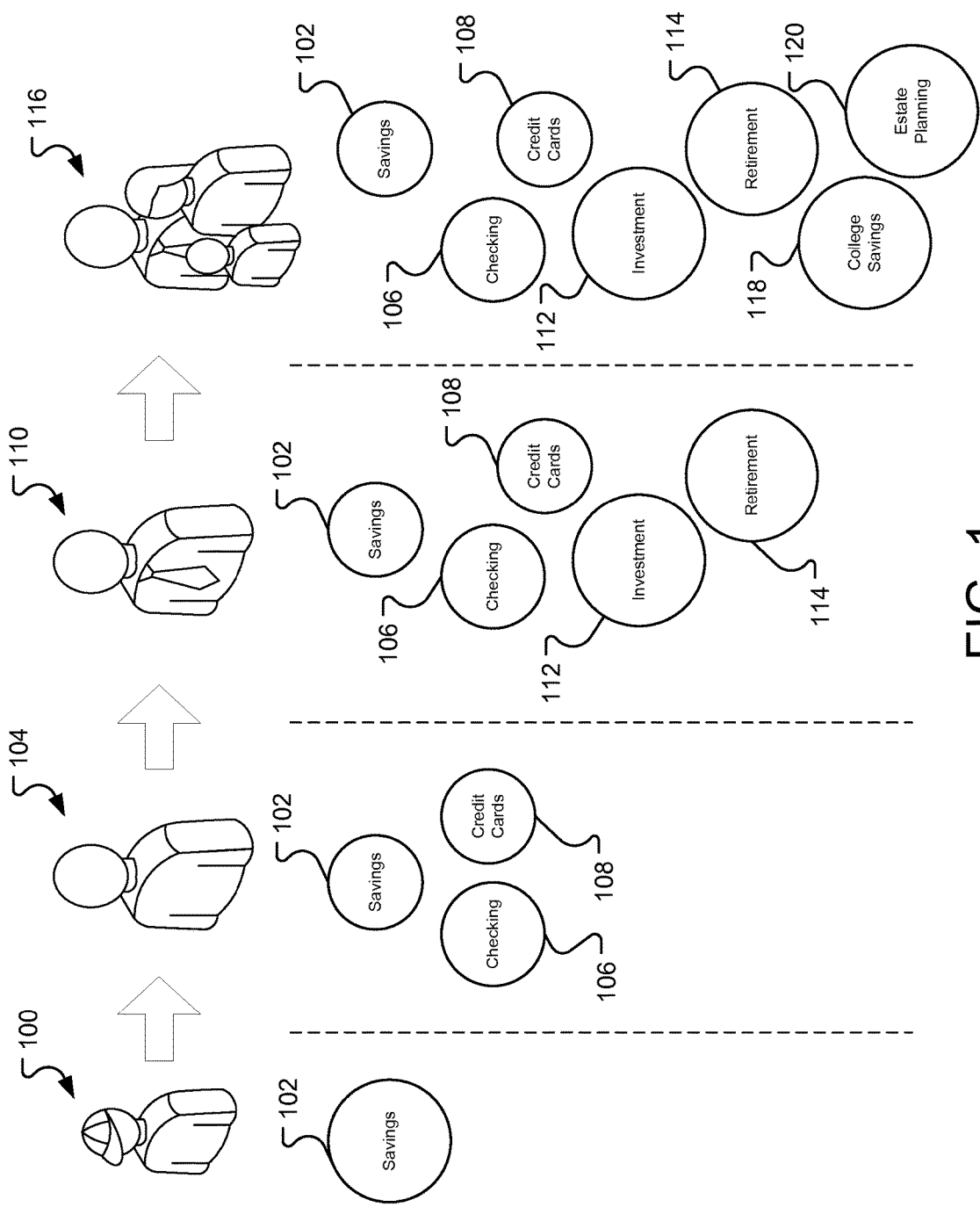
FIG. 1 illustrates the changing financial needs of a user over time.

FIG. 1 illustrates the changing financial needs of a user over time. Referring to FIG. 1, a user's banking and financial needs change over time. A child 100 may get their first savings account 102. Over time, the child becomes a young adult 104. The young adult 104 may add a checking account 106 and credit cards 108 or other revolving credit accounts. As the young adult 104 becomes a young professional 110, he may add investment accounts 112 and retirement accounts 114. When the young professional 110 becomes a family man 116, he may start saving for college 118 and become interested in estate planning 120.

This path described above is not absolute; not everyone becomes a young professional or wants to start a family. For example, a young man may start a business or work in a trade. Further, not every user transitions at the same time. One user may get out of school and become a young professional immediately while another may spend a year touring Europe or struggling to find work. Others may continue their education.

During each phase of the user's life, the user may have different interests and financial goals. The child 100 may be saving for a new bicycle. The young adult 104 may be spending his money on entertainment. The young professional 110 may be looking toward financial stability. The family man may be juggling conflicting interests in saving for his children's education and saving for his retirement.

As users face different challenges, they may be receptive to different kinds of information and education. Some users may be receptive to lessons about compound interest while other users may be receptive to education about budgeting, investing, retirement planning, etc.

Figure 2:
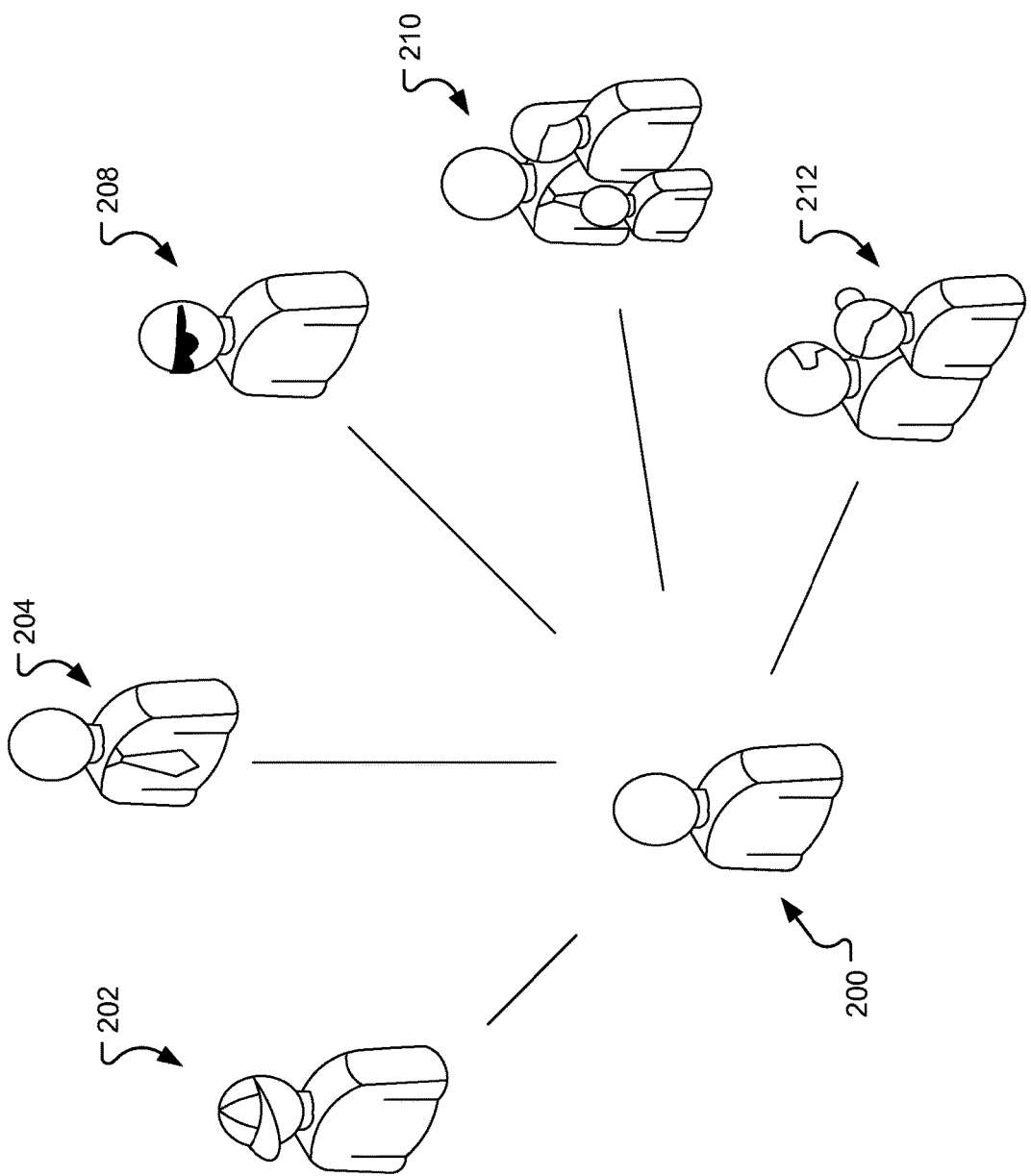
FIG. 2 illustrates a user self-identifying a lifestyle archetype.

An adaptive advice and financial system can provide a holistic view into the financial state of the user, while providing integrated and appropriate educational opportunities. Referring to FIG. 2, in order to provide appropriate advice and guidance, the system may present a user 200 with a number of different lifestyle archetypes. These lifestyle archetypes can represent different kinds of consumers that share common financial needs. For example, the user may self-identify with lifestyle archetypes such as a "pizza and beer" guy 202, a "suit and tie" guy 204, an individual who is "clubbing" guy 208, a "family" guy 210, or "retired and loving it" guy 212. This list of lifestyle archetypes is not complete. Many different other lifestyle archetypes can be defined (for example, a military office, a socialite, single parent, hunter, etc.). Other lifestyle archetypes can represent temporary conditions that affect the user's financial state. During a period of unemployment a user may change their lifestyle archetype to "unemployed." While putting someone through school, the user may change their lifestyle archetype to "paying for college", etc. When a user's lifestyle archetype changes, the system adapts to the changes by altering the advice, feedback, and recommendations that the system provides, as discussed further below.

A lifestyle can be described as the user's attitudes, values, and/or world view. From these attitudes, values, and/or world view, information about their financial habits can be inferred. A lifestyle can also be described as the habits, attitudes, tastes, moral standards, economic level, etc., that together constitute the mode of living of an individual or group.

A lifestyle archetype describes a way of living that is at least partially voluntary or under the direct control of the user. A lifestyle archetype can identify some of the voluntary aspects of a user's lifestyle that are associated with financial decisions, such as spending patterns. While user's tend to change their lifestyle archetype over time (for example, users over the age of 65 are more likely to self-identify with the "retired and loving it" archetype than users under the age of 30), the lifestyle archetype on its own does not convey demographic information. For example, a user under 30 may self-identify with the "retired and loving it" lifestyle archetype. Another user may remain a "pizza and beer" guy for his entire life. Another user may change his archetype over time.

The lifestyle archetype can also be independent of geography. While generally under the user's control, a user frequently has little day to day control over where they live. Choice of location is, in general, more frequently determined by family, education, and employment considerations.

Each of these lifestyle archetypes can be associated with one or more profiles. The profile can include information about users who self-identify with a particular lifestyle archetype. For example, the profile may identify the kind of accounts the users have, the net worth of these accounts, the distribution of assets, income, savings, and budget information. In some implementations, the profile information may be stored as a distribution or percentage (for example, 75% of "suit and tie" guys have a savings account; the average "suit and tie" guy spends an average of $100 per month eating out with a standard deviation of $30, etc.). In some implementations, a lifestyle archetype may have several different profiles. The profile that is selected for use with a particular user may be based on additional information about the user, such as location and other demographic information.

Once the user self-identifies with a particular lifestyle archetype, the system can use the profile as the basis for providing advice and information. In some implementations, identification of the archetype can be user selected or systematically assigned based on user income, spending behavior, income, debt to income ratio's attitudes, values and/or world views.

Figure 3:
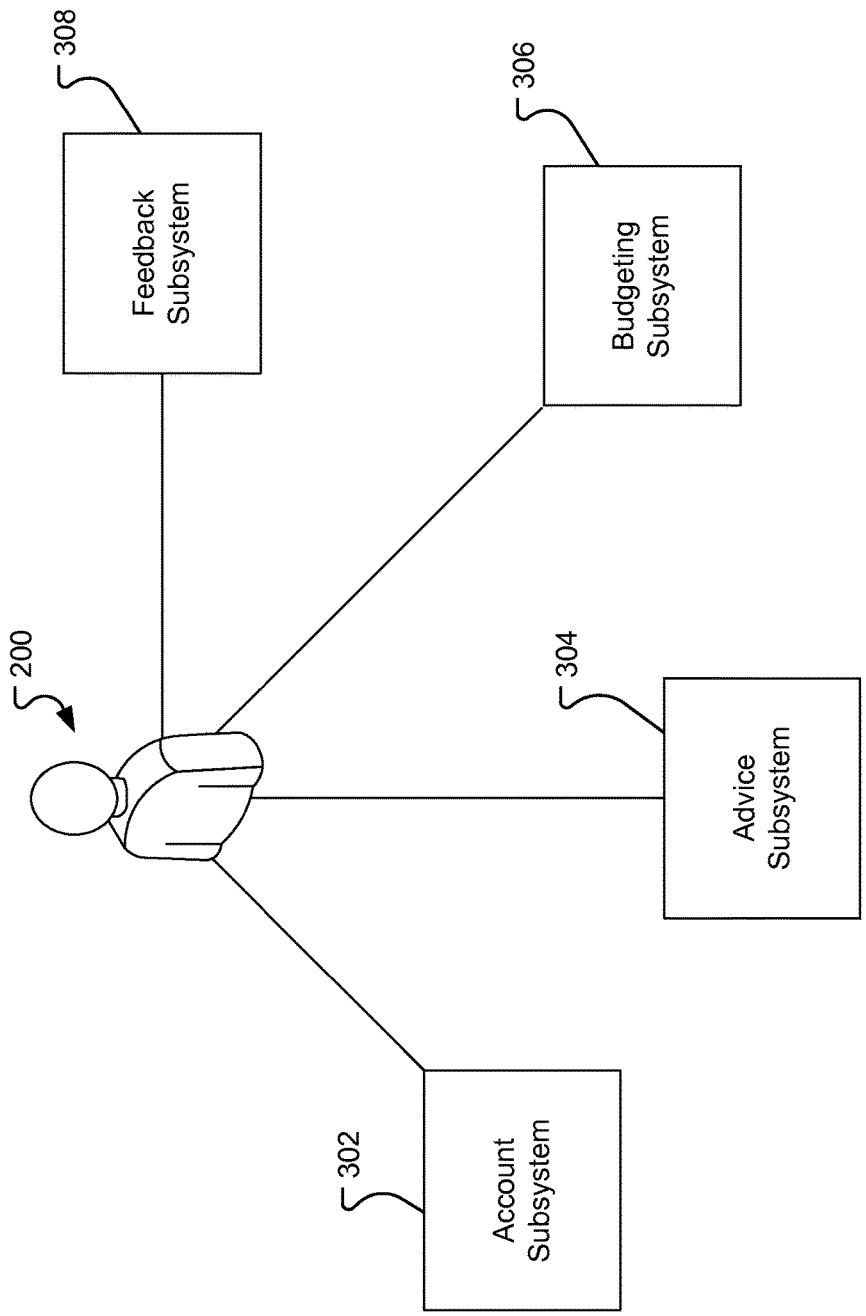
FIG. 3 illustrates different subsystems in the adaptive advice and financial system.

Referring to FIG. 3, the system can include an account subsystem 302 which can present a consolidated view of the accounts of the user 200. In some implementations, the view of the accounts can include all accounts the user has with a particular institution or may include accounts across multiple institutions. For example, a user may be able to add accounts from other institutions to the system by providing an account number and authorizing the system to access the account.

In some scenarios, the account subsystem 302 can facilitate the opening of new accounts. The account subsystem may be integrated with a system that can open a new account on behalf of the user or may redirect the user to another system capable of opening the account. For example, the advice subsystem described further below may recommend that the user open a savings account. The advice subsystem may direct the user to the account subsystem that can facilitate the opening of the account.

The account subsystem can provide information and tracking information about the user's account. Information can include, for example, account balances, transaction history, analysis of spending patterns, etc. For example, the user can view the account balance in each of the different accounts as well as the details of individual transactions (for example, a cash withdrawal, a debit transaction at a grocery store, a credit card transaction at the gas station, etc.).

The adaptive advice and financial system can also include an advice subsystem 304. The advice subsystem can analyze the financial state of the user and make recommendations based on the user's lifestyle archetype. In some scenarios, the advice can be based on the financial state of other users who share the same lifestyle archetype. For example, if 95% of the users who associate with a lifestyle archetype have a savings account then the advice subsystem may recommend the user open a saving account. The advice can be particular to the user's spending, as made available by the account subsystem. For example, if the average college student spends $100 a month going out and the user spends $150, the advice subsystem may recommend reducing the user's entertainment expenses.

The advice can also be independent of other users who self-identify with the lifestyle archetype. For example, the advice subsystem may recommend estate planning regardless of the actions of others in a similar state. However, in general, it is considered advantageous to provide advice that incrementally increases the fiscal well-being of the user rather than recommend drastic changes.

If a user changes their lifestyle archetype the corresponding advice may change. For example, a savings rate may change to zero for the period of time that a user is "unemployed." Similarly, a user who identifies with a "paying for college" archetype may see their recommended savings rate reduced due to the increased expenses.

The advice subsystem 304 can also be particular to the user's situation. For example, the user may inform the system of his intention to purchase a car. Advice about purchasing a car may be provided independent of the particular lifestyle archetype as similar advice may apply to many different people.

The advice subsystem 304 can also verify that the self-identified lifestyle archetype is consistent with the behavior. For example, if the user has previously identified himself as a "pizza and beer" guy but his accounts and behavior seem more like those of a "suit and tie" guy, the advice subsystem can ask the user if they still self-identify as a "pizza and beer" guy. In some implementations, the system may recommend or preliminarily assign a lifestyle archetype to a user based on an analysis the financial habits of the user, including, for example, savings, spending patterns, categories of expenses, etc. For example, a person who saves very little, spends a lot of their disposable income at restaurants and bars, may have a preliminary categorization of "pizza and beer guy."

The advice subsystem 304 can provide education based on the contextual needs of the user. For example, if the user lacks an emergency fund, the advice subsystem 304 can present education material about the importance of an emergency fund. In some implementations, the advice subsystem 304 can entice the user to want to learn more about a particular topic (for example, by asking questions such as "what would you do if your water heater broke?").

The adaptive advice and financial system can also include a budgeting subsystem 306. The budgeting subsystem can include tools to assist the user in creating and managing a budget. For example, the budgeting subsystem can create an initial budget based on the spending history of the user, as reported by the account subsystem. The budgeting system can also create an initial budget based on the budgets of others who self-identify with the same lifestyle archetype as the user. For example, the initial budget can be, at least in part, a statistical function of the budgets and/or spending patterns of the others. In some implementations, the other users that form the basis of the statistical function can be narrowed based on other factors, including demographic and location information. For example, if the user is a male from 24-30 who self identifies as a "suit and tie" guy, the initial budget may be determined, at least in part, based on other users who self-identify as "suit and tie" guy and who are males in the age range of 24-30. Similarly, if the user lives in a high cost of living area, such as New York, the initial budget may be created based on other users who also live in a high cost of living area.

In some implementations, the initial budget can also take into account characteristics of the user independent of the lifestyle archetype. For example, the initial budget can take into account the income of the user, the debts of the user, the cost of living in the geographic area where the user resides and/or works, and other similar details. Once an initial budget is created, the budgeting subsystem can enable the user to make adjustments to the budget.

The budgeting subsystem 306 can also track the spending behavior of the user with respect to the budget. For example, the budgeting system 306 can monitor income (for example, direct deposits or other deposit transactions). The budgeting subsystem 306 can also monitor spending. For example, the budgeting system can track the amount that the user spends on groceries, rent, utilities, etc. The budgeting subsystem 306 can alert the user when spending has exceeded or is projected to exceed the allocated budget.

The budgeting subsystem 306 can also provide financial projections based on the current budget and spending patterns. For example, the budgeting system may determine the amount of money a user will have at a particular milestone or the age at which the user will reach a particular financial milestone. For example, the budgeting system may calculate that the user will have saved $50,000 by the time they are 35.

In some implementations, the budgeting subsystem 306 may prevent or dissuade the user from taking a particular action. For example, the budgeting subsystem 306 may prevent or dissuade the user from taking on debt that the user does not have the cash flow to service.

In some implementations, the budgeting subsystem 306 can enable the user to set savings goals and track the user's progress toward those savings goals. For example, the user may establish a list of savings goals including but not limited to an emergency fund, education funding, large purchases, and retirement.

In some implementations, the budgeting subsystem 306 can determine a budget based on the spending habits of the user.

The adaptive advice and financial system can also include a feedback subsystem 308. The feedback subsystem compares the financial state of the user to those of other similarly situated users (for example, users who self-identify with the same lifestyle archetype, live in the same or similar geographic areas, are the same age, have similar education levels, etc.). Based on the comparison, the advice subsystem 306 can identify areas in which the user is performing well or areas in which the user is performing poorly. For example, a user may be performing well if their spending is less or their savings is more than their peer group.

In some implementations, the feedback subsystem 308 may determine a holistic evaluation of the financial health of the user and may provide a single overall rating.

Figure 4:
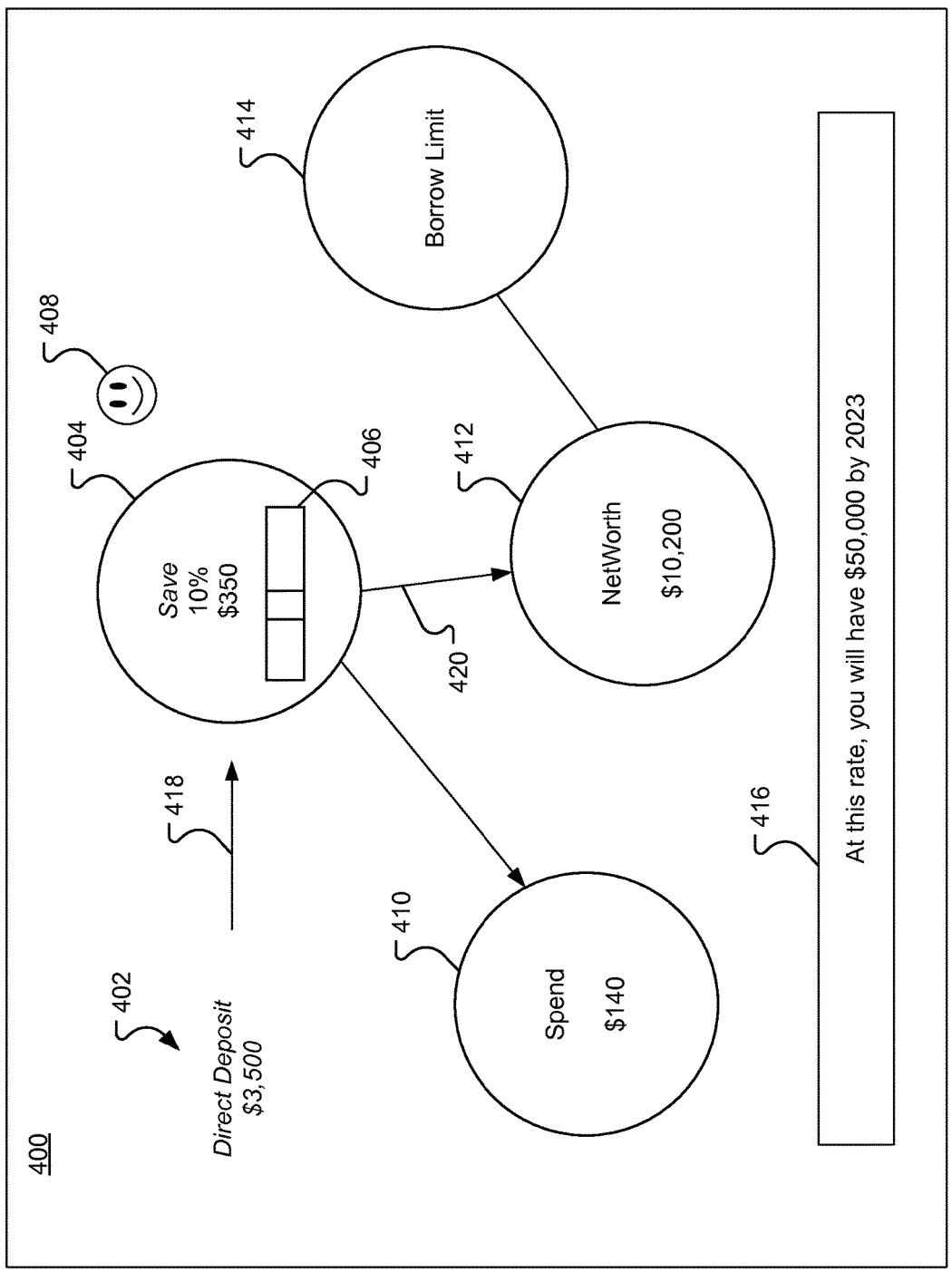
FIG. 4 illustrates an exemplary user interface of the adaptive advice and financial system.

FIG. 4 illustrates an exemplary user interface 400 to the adaptive advice and financial system. A user may access the user interface 400, for example, by accessing a secure web page or application executed on a computational device, such as a computer, a tablet, a smart phone, or other device capable of processing and displaying data.

The user interface displays an income indicator 402, a savings indicator 404, a spend indicator 410, a net worth indicator 412, and a borrow limit indicator 414.

The income indicator 402 can display income from any source or may be restricted to direct deposit or other regular income. Restricting the income to direct deposit income or other regular income can provide a better view into the financial state of the user. As most expenses are regular and repeating, a better picture of financial health can be obtained by restricting the income used to service those repeating expenses to regular and not windfall income. In this example, the income indicator 402 indicates that the user receives a direct deposit of $3,500 per month. The income indicator is connected to the savings indicator 404 by a directed arrow 418. The directed arrow 418 indicates that income, as illustrated by the income indicator, provides the basis for the savings indicator.

The user's savings indicator 404 displays information about the amount of money (e.g. from the income indicator 402) that the user has elected to save. The user's savings indicator can display the dollar amount the user is savings and/or a percentage of their income that the user is saving. In this example the savings indicator 404 shows that the user has elected to save 10% of their income or $350 per month.

The user interface 400 can also include a slider 406 associated with the user's savings indicator that allows the user to adjust the amount that they save. As the user moves the slider 406, the amount and percentage displayed in the savings indicator 404 decreases or increases.

The user interface 400 can also include a feedback indicator 408 which provides feedback about the user's savings. The feedback can be a simple positive, neutral, or negative indicator (for example, a happy face, a neutral face or a sad face; or a thumps up, thumps down, or thumbs sideways). As the user moves the slider 406, the feedback indicator can change to reflect the decrease or increase in savings.

In some implementations, the feedback indicator 408 may be based on a comparison of the user to other users who identify with the same lifestyle archetype. For example, if the user has self-identified with a lifestyle archetype that has a relatively low saving rate (for example 3%) then a lower savings rate by the user (for example 5%) may result in a positive feedback indicator. However, if that same user has self-identified with a lifestyle archetype associated with a relatively higher savings rate (for example, 10%) then the same 5% savings rate may result in a negative feedback indicator.

The spend indicator 410 displays the amount of money that the user has available to spend on nonessential or entertainment related items. In general, the spend can be the difference between the amount indicated in the income indicator 402 and the amount the user is saving coupled with the amount of expenses the user incurs each month. The information about the user's expenses can be drawn, for example, from a budgeting subsystem, such as the budgeting subsystem 306 of FIG. 3.

The net worth indicator 412 can display the total amount of assets owned by the user. In some implementations, the net worth indicator 412 can display the total value of the liquid assets owned by the user. The amount that the user elects to save (e.g., using the savings indicator 404) increases the user's net worth, as illustrated by a directed arrow 420. In other implementations, the net worth indicator 412 can display the total value of all the assets owned by the user (for example, the amount displayed by the net worth indicator may include the user's home equity). The net worth information may be provided by an account subsystem (for example, the account subsystem 302 of FIG. 3).

The borrow limit indicator 414 displays the total amount of credit or borrowing that is available to the user. The borrow limit may be calculated based on the user's income, any outstanding debts that the user has, the amount of money that the user spends servicing the debt, and the amounts of money that the user has available to service the debt.

The user interface 400 can also display a projection 416 of the user's future financial state. The projection can serve as a motivational tool to encourage the user to increase their savings. In this example, the projection 416 indicates that the user will have $50,000 by 2023.

The amount displayed by the spend indicator 410, the amount displayed by the borrow limit indicator 414, and the projection 416 may be changed as the user adjusts the slider 406. For example, if a user elects to save more, they have less available to spend. If a user elects to save less, he will have less money in the future. If a user elects to save more, they will have less income available to service debt. As the user interacts with their borrow limit, the system can automatically adjust spending limits and automatically establish payments to those credit limits.

Figure 5:
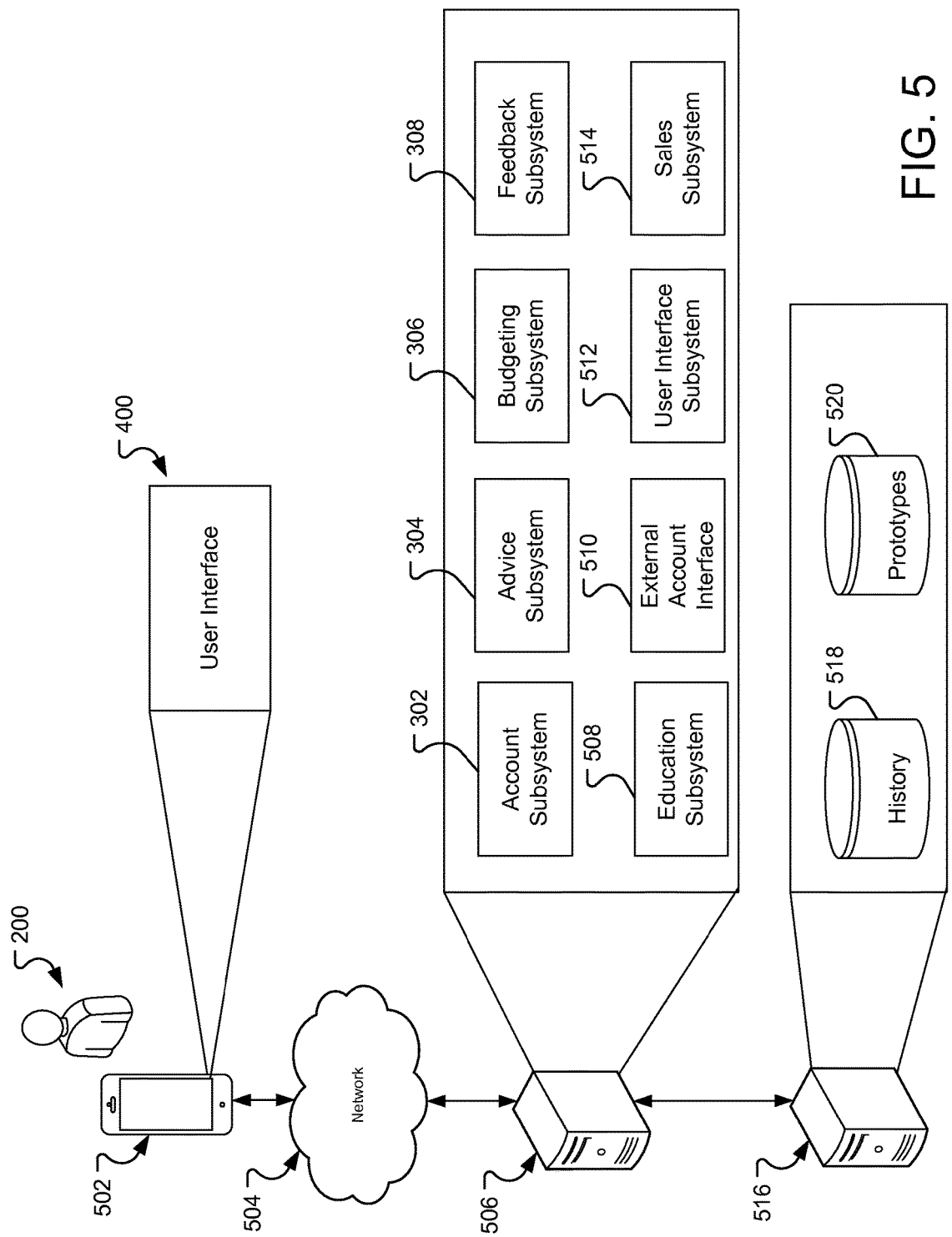
FIG. 5 is an architectural representation of the adaptive advice and financial system.

Referring to FIG. 5, the user may access the user interface 400 on a smart phone 502. The user interface may also be accessed on a tablet, personal computer, or any other device capable of receiving information over a network and displaying the information to the user.

The smart phone 502 may communicate with an application server 506 over a network 504 (for example, the Internet). The communication can be secured using conventional encryption technology (for example, the Secure Socket Layer (SSL) communication protocol).

The application servers 506 may execute one or more subsystems. An application server may execute one or more subsystems and each subsystem may be running on one or more application servers. Communications from the smart phone 502 may be routed to the appropriate application server using conventional routing techniques.

The application servers 506 can execute the accounting subsystem 302, the advice subsystem 304, the budgeting subsystem 306 and the feedback subsystem 308, as discussed above.

Additionally, the application servers 506 may execute an education subsystem. The education subsystem may include documents, video recordings, audio records, and other educational materials that are designed to educate about financial matters. The advice subsystem 304 may identify a topic of education for a user (for example, making a budget). The advice subsystem 304 may interact with the education subsystem 508 to identify and present education material to the user.

The application servers 506 may also include an external account interface 510. The external account interface accesses account information that is not otherwise available to the account subsystem 302. For example, the user may have a credit card with an external bank however, the user may have given permission to the adaptive account and advice system to access information about the account. Following a predetermined protocol, the external account interface 510 may obtain the account information from the external bank.

The application servers 506 may include a user interface subsystem 512. The user interface subsystem may generate user interfaces for some platforms. For example, the user interface may generate or otherwise provide a web page provided to a web browser on the client device. The user interface subsystem may also receive information from the user (for example, input that the user provides to the user interface 400).

The application servers may also include a sales subsystem 514. When the advice subsystem 304 recommends that the user obtain a particular type of financial account or open a particular type of financial instrument, the sale subsystem 514 can present the user with details about the particular type of account or financial instrument offered by the institution.

The application servers 506 may access data from data servers 516. The application servers 506 may communicate with the data servers 516 over a network (for example, a local area network). The data servers 516 store data that is used by the application servers. For example, the data servers 516 may contain a history database 518 that stores account and transaction history. The data servers 516 may also contain a lifestyle archetype database 510 that stores the lifestyle archetypes with which the user may identify. The lifestyle archetype database 510 may also store the profile information associated with the lifestyle archetypes.

Figure 6:
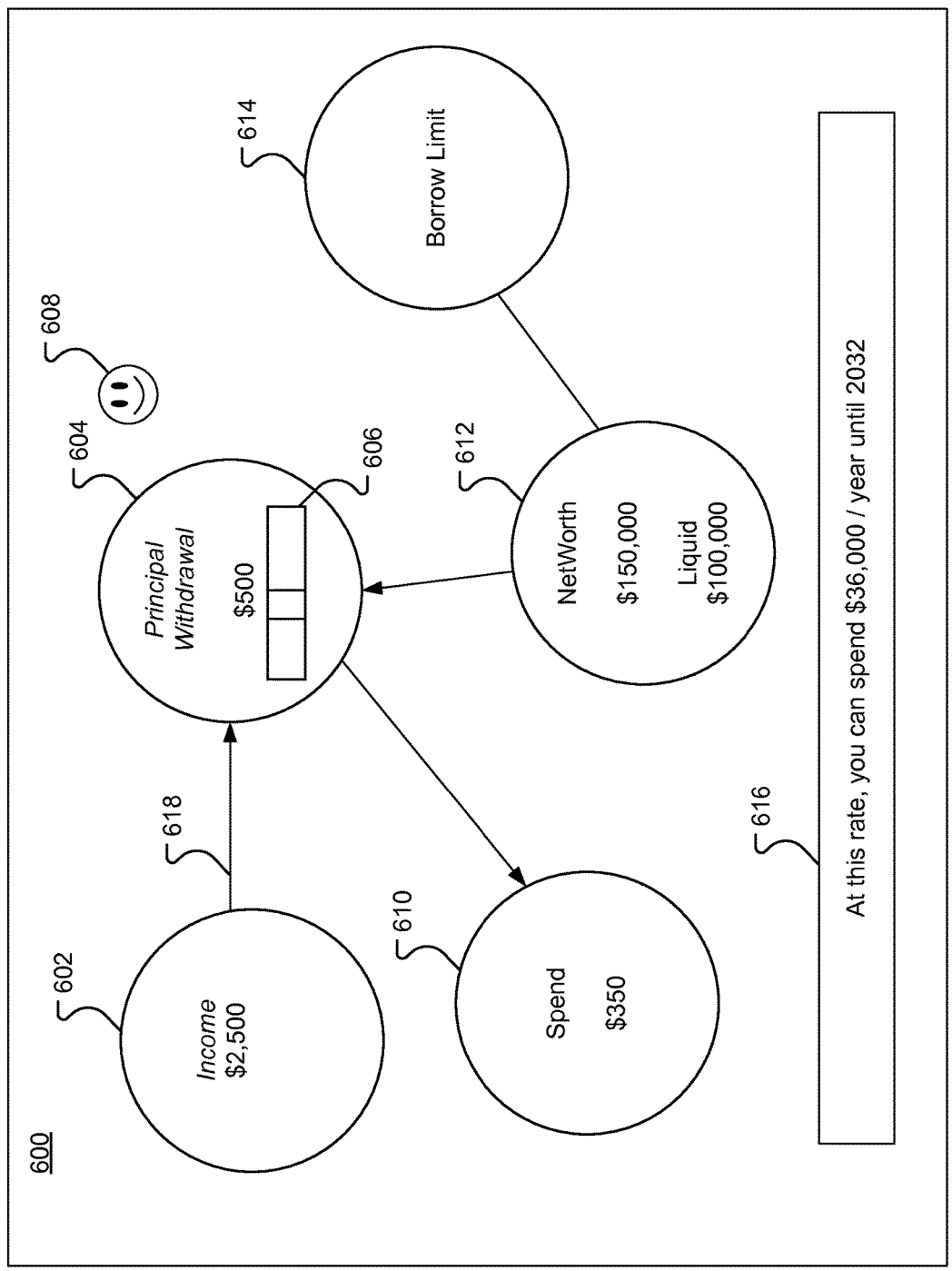
FIG. 6 illustrates another exemplary user interface to the adaptive advice and financial system.

FIG. 6 illustrates another exemplary user interface 600 to the adaptive advice and financial system. The adaptive financial system may display different user interfaces for different users. For example, the user interface 400 of FIG. 4 may be appropriate and displayed to users during the asset acquisition phase of their financial life. The user interface 600 of FIG. 6 may be appropriate for users who are depleting their assets. A user may be managing the depletion of assets for a variety of different reasons; for example, a user may be retired. The user may also be unemployed or underemployed. The user may be paying educational expenses (either their own, their spouse's, or those of one or more children). The user may be paying medical expenses associated with an illness. In some implementations, each of these states may be associated with a different lifestyle archetype. As described above, the advice provided by the adaptive advice system will be determined based on the lifestyle archetype.

The user interface 600 is associated with asset depletion. The income indicator 602 can display income from any source or may be restricted to direct deposit or other regular income. In this example, income from multiple sources is combined into income indicator 602. The user can select the income element 602 to be presented with additional detail about the user's income, as discussed further below.

The withdrawal indicator 604 is used to control the withdrawal of money from the net worth of the user. In this example, the directed arrow 620 illustrates the flow of money from the net worth indicator 612 to the withdrawal indicator 604. The withdrawal indicator 604 enables a user to select the amount of their net worth that they would like to use for regular expenses. The amount may be selected as a fixed amount (e.g. $500) or as a percentage (e.g. 1%). In some implementations, the withdrawal indicator 604 and a savings indicator (e.g., the savings indicator 404 of FIG. 4) may be a single component. A positive amount in a combined savings/withdrawal indicator may indicate that income is being saved, and thereby contributing to net worth. A negative amount on a combined savings/withdrawal indicator may indicate that the income, if any, of the user is being supplemented by taking money from their net worth.

The system can identify the components of the net worth that are liquid and those that are not. For example, a user may not be able to access the funds in a 401K or real estate.

The user interface 600 can also include a feedback indicator 608 which provides feedback about the user's withdrawal rate and other financial decisions. As above, the feedback can be a simple positive, neutral, or negative indicator (for example, a happy face, a neutral face or a sad face; or a thumps up, thumps down, or thumbs sideways). As the user moves the slider 406, the feedback indicator can change to reflect the decrease or increase in savings.

Because the feedback indicator 608 may be based on a comparison of the user to other users who identify with the same lifestyle archetype, financial conditions that are not objectively optimal may still be contextually good decisions and result in a positive feedback indicator. For example, an unemployed individual who is minimizing their withdrawal rate may receive a positive feedback indicator (e.g. smiley face), whereas a "suit and tie guy" may receive a negative feedback indicator (e.g. frowny face) if the user is not saving. In some instances, the user can click on the feedback indicator to get more information as to why the indictor is set to a particular position. For example, a user may select a negative feedback indicator to determine why the indicator is negative (e.g., 'Why is this a frown?'). The system can display a list of the factor that contributed to the negative feedback indicator, for example, a low savings rate, too much debt, too much disposable income spent on entertainment, etc.

The spend indicator 610 displays the amount of money that the user has available to spend on nonessential or entertainment related items. In general, spend represented by the spend indicator 610 can be the difference between the amount indicated in the income indicator 402, the amount the user is withdrawing from net worth each month (as illustrated by the withdrawal indicator 604), and the bills and other expenses the user pays (e.g. utility bills, grocery items, clothing, etc.). The information about the user's expenses can be drawn, for example, from a budgeting subsystem, such as the budgeting subsystem 306 of FIG. 3.

The net worth indicator 612 illustrates the user's current net worth. The net worth of the user may include items such as investment accounts, savings accounts, and other financial investments. In some implementations, the network indicator 612 may include a breakdown of liquid assets and total assets. Liquid assets are assets that can be converted into cash quickly and with minimal impact to the price received. Liquid assets include, for example, cash, securities, precious metals. Total assets can include liquid and illiquid assets. Illiquid assets are assets that cannot be converted into cash quickly without an impact to the price received. Illiquid assets include, for example, real estate. The net worth indicator 612 may reflect a subset of the assets the user owns. For example, the net worth indicator 612 may not reflect the value of the user's clothes, automobile, or other similar assets.

The borrow limit indicator 614 displays the total amount of credit or borrowing that is available to the user. The borrow limit may be calculated based on the user's income, any outstanding debts that the user has, the amount of money that the user spends servicing the debt, and the amounts of money that the user has available to service the debt.

The user interface 600 can also display a projection 616 of the user's future financial state. The projection can serve as a motivational and informational tool to enable the user to manage their spending. In this example, the projection 616 indicates that the user can spend at the current rate until 2032.

Figure 7:
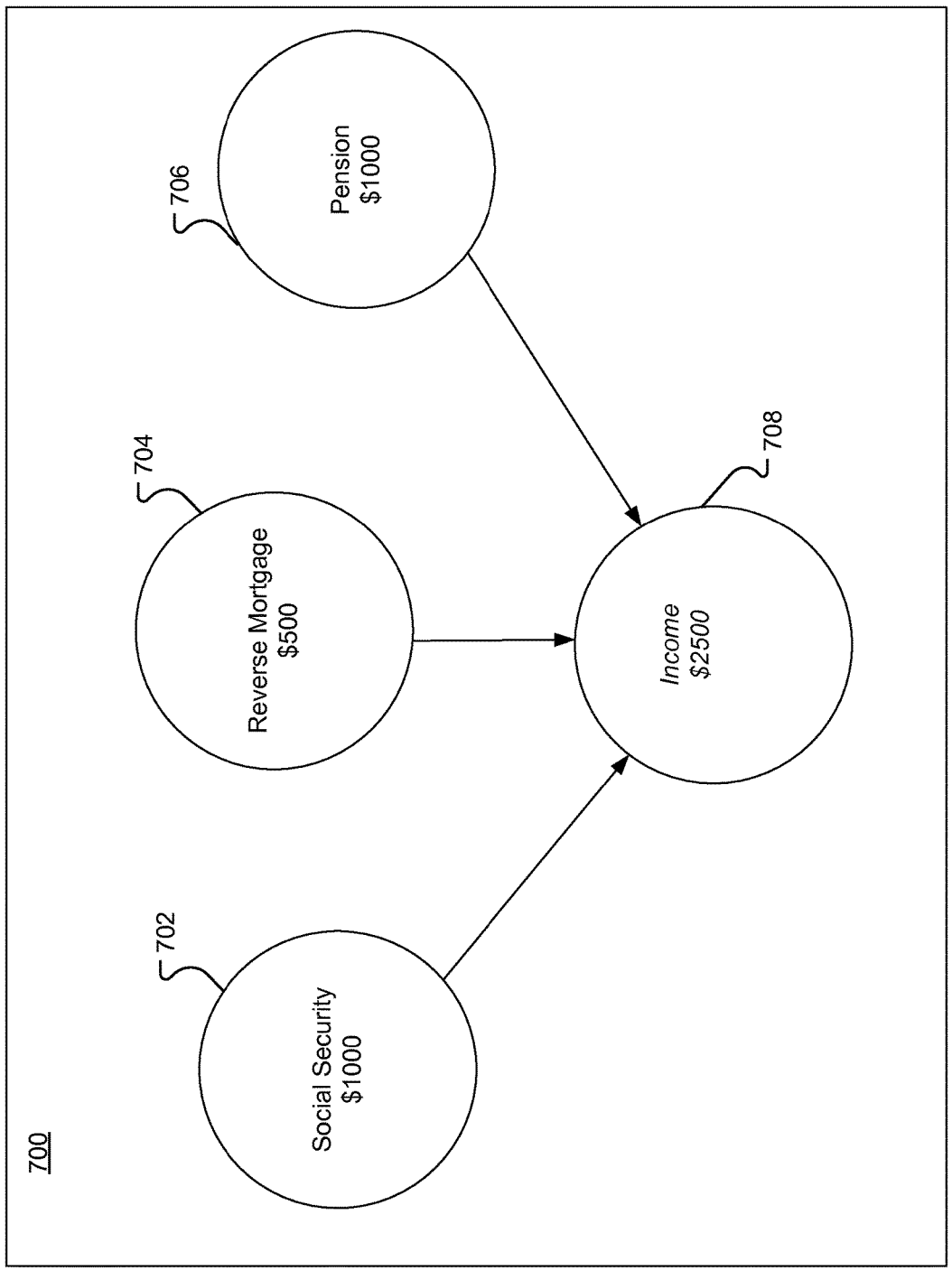
FIG. 7 illustrates an exemplary user interface for presenting income information to a user.

As discussed above, after selecting the income indicator 602, the user may be presented with a user interface that provides additional details about the user's income. For example, FIG. 7 illustrates an exemplary user interface 700 for presenting income information to a user. In this example, different sources of income are presented (for example, a social security income source 702, a reverse mortgage income source 704, and a pension income source 706). The user interface graphically combines the sources of income into a single income total 708. Other presentations can also be used. For example, sources of income may be presented in a tabular form, as a pictograph, pictures. In some implementations, the pictures may be selected to create an emotional connection between the user and their money. In some implementations, the size of the picture may be indicative of the relative size of the corresponding expenditure, for example, if an expense category is children's expenses and the transactions are aligned to different children. In one view you get a sense that one child is spending twice as much as another child based on the size of their picture.

Figure 8:
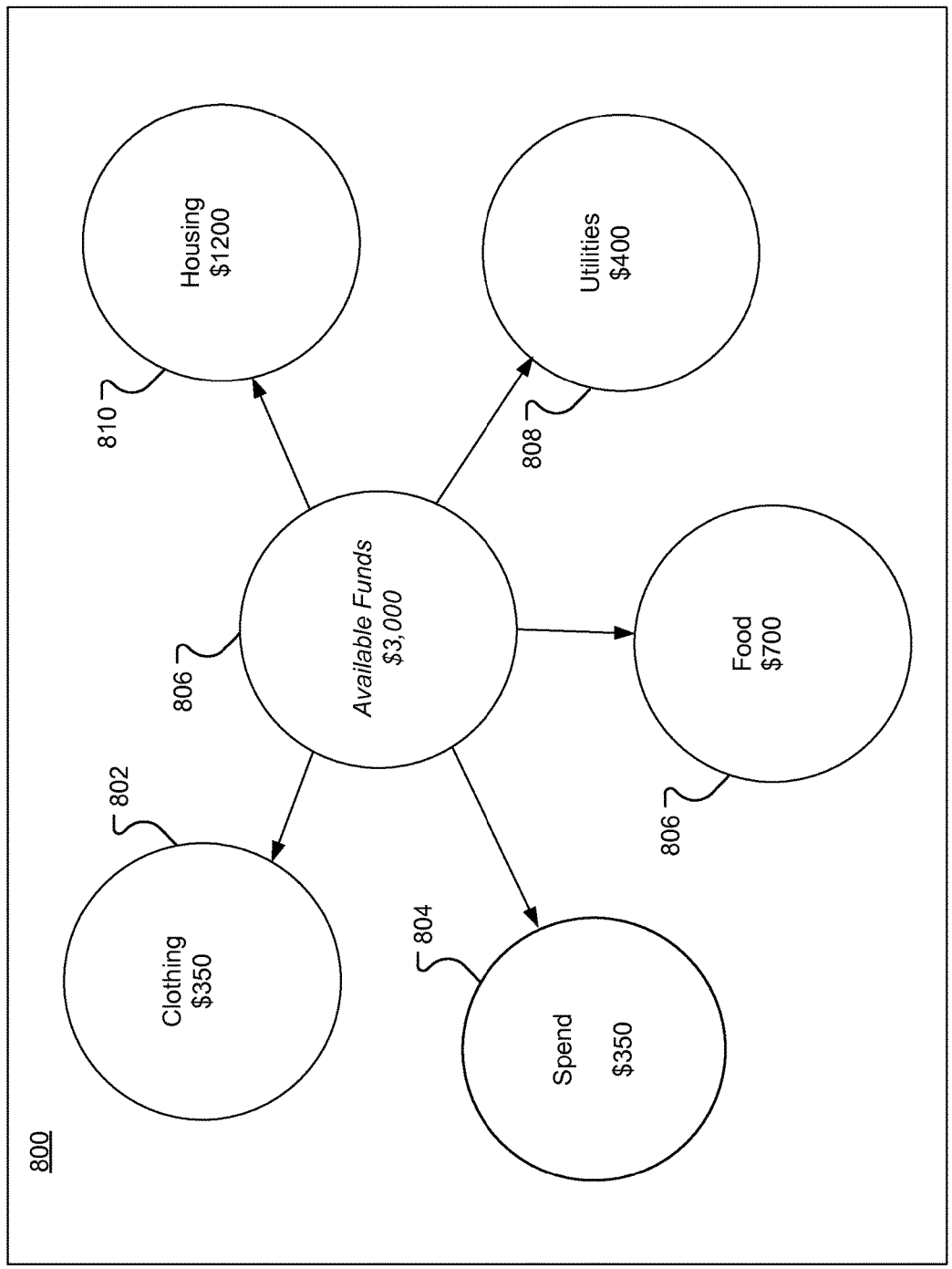
FIG. 8 illustrates an exemplary user interface 800 for presenting bill payment information.

FIG. 8 illustrates an exemplary user interface 800 for presenting bill payment information. In this example, the available funds are presented centrally in an available funds indicator 806. The amount presented in the available funds indicator may be, for example, income adjusted by savings or withdrawal from net worth. For example, the user interface 600 of FIG. 6 shows an income of $2,500 and a withdrawal from net worth of $500. Returning to FIG. 8, the available funds indicator 806 presents the total amount of $3,000.

Directed arrows show the available funds being distributed to service various expenses. In some implementations, the expenses can be presented in categories of related expenses. For example, the user interface 800 includes a clothing category indicator 802, an insurance category indicator 810, a utilities category indicator 808, and a food category indicator 806.

Each expense category indicator can have an amount associated with the category. For example, the expenses include $1200 for housing, $400 for utilities, $700 for food, and $350 for clothing. The amount indicated by the spend indicator 804 is the amount in available funds indicator 806 minus the amount allocated to the various expense categories. In this example, the spend is $350.

In some implementations, the expenses may not be organized into expense categories but may instead be presented as individual expenses or individual payees. The expenses may also be presented in tabular form (for example, in a table that identifies each of the individual expenses or expense categories along with an associated amount).

In some implementations, selecting one of the expense category indicators (e.g., the utilities indicator 808) causes the user interface to present individual expenses within the expense category. For example, the utilities indicator may be associated with individual expenses for television, gas, water, electricity, etc.

In some implementations, the system may ask the user before paying the expenses. The system may, for example, provide the user with a notification that a bill or expense is going to be paid and ask the user for confirmation. The user may be able to respond to the confirmation using a yes/no interface presented on a client device.

In some implementations, the user may be able to customize the notifications. For example, the user may be able to specify a threshold amount over which the user must give approval (for example, the user may be provided with an approval notification for all charges over $100). The user may be able to specify a threshold amount per category or payee (for example, the user may be provided with an approval notification for electric bills over $150 or for payment to a predetermined payee over $150).

In some implementations, the threshold may be a percentage over a norm, the norm may be calculated over a period of time (such as 6 months, a year, or multiple years) or may be determined based on the last payment (for example, the user may be provided with an approval notification is the amount to be paid exceeds the previous amount to be paid by 10% or exceeds a running average by %10). The norm may also be calculated seasonally (e.g. heat is expected to be higher in the winter, electricity is expected to be higher in the summer, etc.). The system may perform a trend analysis on different expenses to determine an expected amount. For example, the system may account for a regional increase in the cost of heat.

In some implementations, expenses may be grouped together by the user. For example, the user may combine electricity and heating together into an aggregate category. As the heating bill rises in the winter, the electric bills falls. Therefore, the user may wish to be provided with an approval notification only if the combined heat and electric bill changes substantially (e.g. greater than a threshold).

In some implementations, the system can compare the expenses of the user to the expenses of their peers. The user may be notified, for example, if the user's expenses are substantially different than their peers (e.g. greater than a threshold). For example, if the user's peers start spending less on heat the user may be notified of a potential cost savings opportunity.

Figure 9:
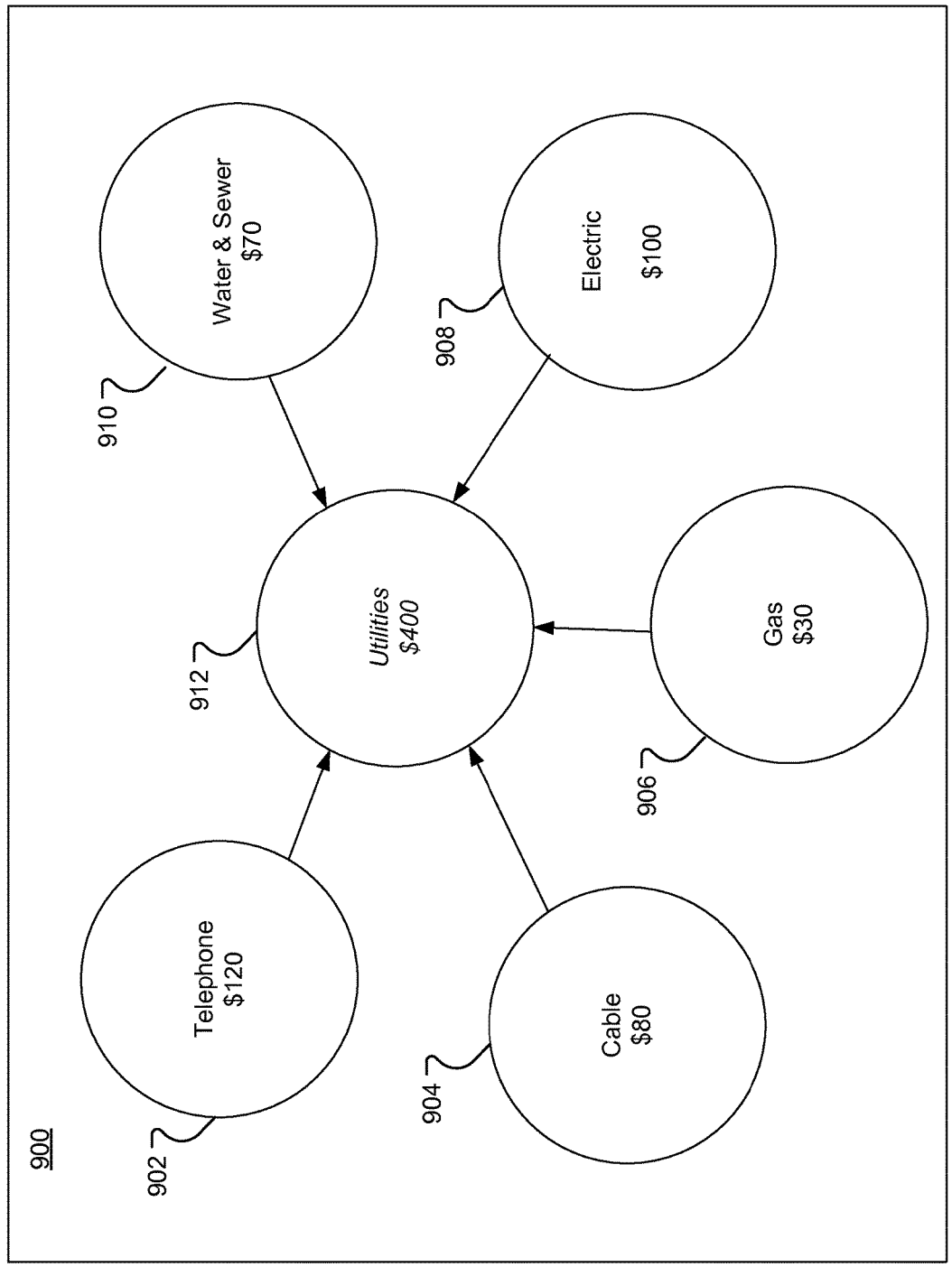
FIG. 9 illustrates an example user interface presenting individual expenses in an expense category.

FIG. 9 illustrates an example user interface for presenting individual expenses in an expense category. In this example, the utilities category indicator 912 is presented centrally on the user interface 900. Different expenses that are part of the utility expense category are presented to the user.

For example, a telephone expense indicator 902, a cable expense indicator 904, a gas expense indicator 906, an electric expense indicator 908, and a water & sewer expense indicator 910 are presented to the user. Directional arrows flow from the expense indicators to the utility category indicator 912.

In some implementations, each expense indicator may be associated with bills that are paid to individual payees.

As discussed above, the expense information may also be presented in a tabular form. In some implementations, the presentation of the expense information may vary depending on the amount of information to be presented. For example, the structure of the user interface 900 may be appropriate for expense categories or other user interfaces that display a relatively small amount of information (for example, 5-10 expenses). In scenarios, where more information needs to be presented to the user, another structure, such as a table, may be presented. The determination to change from one type of user interface presentation to another may be determined by comparing the amount of information to be presented to a predetermined threshold. If the amount of information to be presented exceeds the threshold (e.g., 8 items) then the information may be presented in a tabular form. If the amount of information to be presented is less than the threshold, then the information may be presented as shown in FIG. 9. Additionally or alternatively, a similar determination can be made for the information presented in FIGS. 7 and 8.

Figure 10:
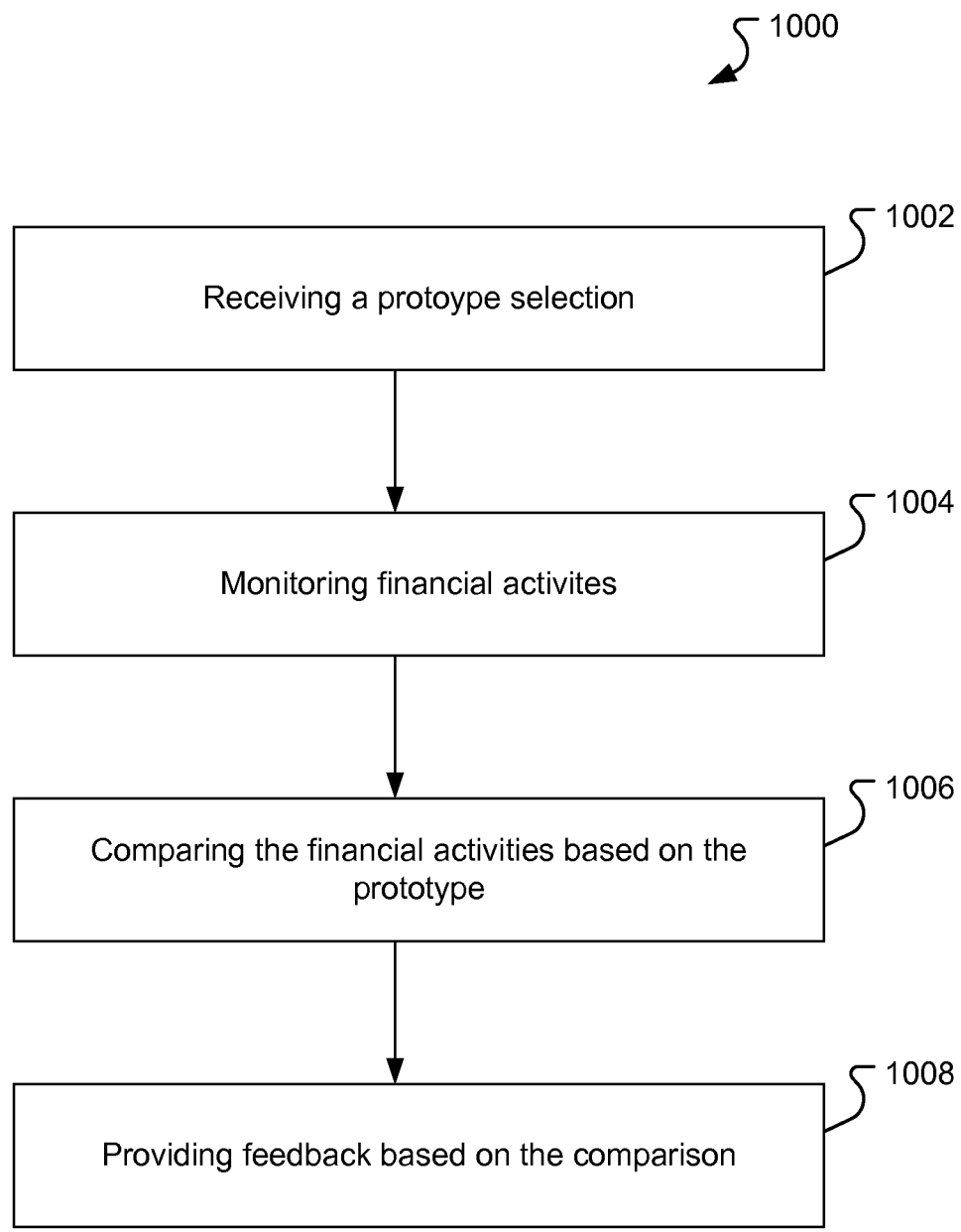
FIG. 10 is a flow chart of an exemplary process performed by the adaptive advice and financial system.

FIG. 10 is a flow chart of an exemplary process 1000 performed by the adaptive advice and financial system.

The process 1000 receives 1002, a lifestyle archetype selection of a user. The lifestyle archetype selection is a self-identification with a particular lifestyle archetype. The lifestyle archetype is associated with a predetermined allocation of income and spending.

The process 1000 monitors 1004 financial activities of the user. The process can monitor the user's income and spending habits. For example, the process 1000 can determine an amount the user spends in different categories, including utilities, groceries, clothes, interest payments, etc.

The process 1000 compares 1006, the financial activities of the user, to the financial activities of other users having the lifestyle archetype. For example, the process may compare the savings rate of the user to the average savings rate of other users having the same lifestyle archetype.

The process 1000 provides 1008 feedback to the user based on the comparison. The feedback can be, for example, a smiley face when the user's financial activities are more favorable than the other users or a frowning face when the user's financial activities are less favorable than the other users.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry (e.g., an FPGA (field programmable gate array) or an ASIC (application-specific integrated circuit)). The apparatus can optionally include, in addition to hardware, code that creates an execution environment for computer programs (e.g., code that constitutes processor firmware, a protocol stack, a database management system, an operating system, or a combination of one or more of them).

A computer program, which may also be referred to or described as a program, software, a software application, a module, a software module, a script, or code, can be written in any form of programming language, including compiled or interpreted languages, or declarative or procedural languages. It can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive) to name just a few).

Computer-readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN), e.g., the Internet.

The computing system can include clients and servers. A client and server are generally remote from each other and typically interact through a communication network. The relationship between client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method comprising:
receiving data indicating a user-selected lifestyle archetype of a user, wherein the user-selected lifestyle archetype identifies a predetermined allocation of income and spending;
retrieving, by a central processing unit of a computer system, data from a database, the data representing financial activities of the user;
monitoring, by a computer system, the financial activities of the user;
executing, by an application server, a feedback subsystem;
comparing, by the feedback subsystem, the financial activities of the user with the financial activities of at least one different user having selected a user-selected lifestyle archetype substantially similar to the user-selected lifestyle archetype of the user, wherein the financial activities comprise a savings rate;
generating, by the feedback subsystem, a rating of the user at least partially based on the comparing of the financial activities of the user with the financial activities of the at least one different user, wherein when the savings rate of the user is higher than the savings rate of the at least one different user, the rating of the user is higher than a rating of the at least one different user;
sending, by the computer system, first graphical user interface data that when rendered on a display device of a user device of the user renders a first graphical user interface with one or more visual representations representing a feedback indicator that indicates the generated rating;
comparing, by the computer system, the financial activities of the user to a second lifestyle archetype different from the user-selected lifestyle archetype;
determining, by the computer system, that the financial activities of the user more match the second lifestyle archetype relative to the user-selected lifestyle archetype;
sending, by the computer system, second graphical user interface data that when rendered on the display device of the user device renders a second graphical user interface that prompts the user to confirm that they self-identify with the second lifestyle archetype;
receiving, by the computer system through the second graphical user interface, feedback input from the user device, the feedback input indicating that the user confirmed that they self-identify with the second lifestyle archetype;
updating one or more portions of memory designated for the user with feedback data associated with the feedback input;
updating, by the feedback subsystem and responsive to receiving the feedback input, the rating of the user based on the second lifestyle archetype; and
sending, by the computer system, third graphical user interface data that when rendered on the display device of the user device renders a third graphical user interface with one or more visual representations representing a feedback indicator that indicates the updated rating.

2. The method of claim 1, further comprising:
determining an educational need of the user based on the monitoring; and
presenting educational material to the user based on the determined educational need.

3. The method of claim 1, wherein the financial activities of the user includes a percentage of income that is saved.

4. The method of claim 1, further comprising:
recommending the user open a new financial account based on a comparison of financial accounts of the user and financial accounts common to the at least one different user.

5. The method of claim 1, further comprising:
determining an amount of income available to service debt of the user;
wherein monitoring the financial activities of the user includes monitoring the amount of income used to service debt; and
wherein generating the rating of the user is further based on the monitoring the amount of income used to service debt and the determined amount of income available to service debt.

6. The method of claim 1, wherein the user-selected lifestyle archetype identifies at least one spending choice that is a voluntary financial decision.

7. The method of claim 1, wherein the user-selected lifestyle archetype is representative of the way the user prefers to live.

8. The method of claim 1, wherein the user-selected lifestyle archetype is representative of a phase in the user's life.

9. The method of claim 1, where in the user-selected lifestyle archetype is representative of at least one of as the user's attitudes, values, and world views.

10. A system comprising:
one or more computers and one or more storage devices storing instructions that are operable, when executed by the one or more computers, to cause the one or more computers to perform operations comprising:
receiving, from a user, data indicating a user-selected lifestyle archetype of the user, wherein the user-selected lifestyle archetype identifies a predetermined allocation of income and spending;
retrieving data from a database, the data representing financial activities of the user;
executing a budgeting subsystem configured to monitor the financial activities of the user;
executing a feedback subsystem configured to:
compare the financial activities of the user with the financial activities of at least one different user having selected a user-selected lifestyle archetype substantially similar to the user-selected lifestyle archetype of the user, wherein the financial activities comprise a savings rate; and
generate a rating of the user at least partially based on the comparing of the financial activities of the user with the financial activities of the at least one different user, wherein when the savings rate of the user is higher than the savings rate of the at least one different user, the rating of the user is higher than a rating of the at least one different user; and
executing an advice subsystem configured to:
send first graphical user interface data that when rendered on a display device of a user device of the user renders a first graphical user interface with one or more visual representations representing a feedback indicator that indicates the generated rating;
compare the financial activities of the user to a second lifestyle archetype, different from the user-selected lifestyle archetype;
determine that the financial activities of the user more match the second lifestyle archetype relative to the user-selected lifestyle archetype;
send second graphical user interface data that when rendered on the display device of the user device renders a second graphical user interface that prompts the user to confirm that they self-identify with the second lifestyle archetype;
receive, through the second graphical user interface, feedback input from the user device, the feedback input indicating that the user confirmed that they self-identify with the second lifestyle archetype;
update one or more portions of memory designated for the user with the feedback data associated with the feedback input; and
send third graphical user interface data that when rendered on the display device of the user device renders a third graphical user interface with one or more visual representations representing a feedback indicator that indicates an updated rating, the updated rating being generated by the feedback subsystem based on the second lifestyle archetype.

11. The system of claim 10, wherein the advice subsystem is further configured to:
determine an educational need of the user based on the monitoring; and
send fourth graphical user interface data that when rendered on the display device of the user device renders a fourth graphical user interface that presents educational material to the user based on the determining.

12. The system of claim 10, wherein the financial activities of the user includes a percentage of income to be saved.

13. The system of claim 10, wherein:
the advice subsystem is further configured to recommend the user open a new financial account based on a comparison of financial accounts of the user and financial accounts common to the at least one different user.

14. The system of claim 10, wherein:
the budgeting subsystem is configured to determine an amount of income available to service debt;
monitoring the financial activities of the user includes monitoring the amount of income used to service debt; and
generating the rating of the user is further based on the monitoring the amount of income used to service debt and the amount of income available to service debt.

15. The system of claim 10, wherein the lifestyle archetype identifies at least one spending choice that is a voluntary financial decision.

16. A non-transitory computer storage medium encoded with computer program instructions that when executed by one or more computers cause the one or more computers to perform operations comprising:
receiving data indicating a user-selected lifestyle archetype of a user, wherein the user-selected lifestyle archetype identifies a predetermined allocation of income and spending;
retrieving data from a database, the data representing financial activities of the user monitoring the financial activities of the user;
comparing the financial activities of the user with the financial activities of at least one different user having selected a user-selected lifestyle archetype substantially similar to the user-selected lifestyle archetype of the user, wherein the financial activities comprise a savings rate;
generating a rating of the user at least partially based on the comparing of the financial activities of the user with the financial activities of the at least one different user, wherein when the savings rate of the user is higher than the savings rate of the at least one different user, the rating of the user is higher than a rating of the at least one different user;
sending, by the computer system, first graphical user interface data that when rendered on a display device of a user device of the user renders a first graphical user interface with one or more visual representations representing a feedback indicator that indicates the generated rating;
comparing the financial activities of the user to a second lifestyle archetype different from the user-selected lifestyle archetype;
determining that the financial activities of the user more match the second lifestyle archetype relative to the user-selected lifestyle archetype;
sending second graphical user interface data that when rendered on the display device of the user device renders a second graphical user interface that prompts the user to confirm that they self-identify with the second lifestyle archetype;

receiving through the second graphical user interface, feedback input from the user device, the feedback input indicating that the user confirmed that they self-identify with the second lifestyle archetype;

updating one or more portions of memory designated for the user with feedback data associated with the feedback input;

updating, responsive to receiving the feedback input, the rating of the user based on the second lifestyle archetype; and sending third graphical user interface data that when rendered on the display device of the user device renders a third graphical user interface with one or more visual representations representing a feedback indicator that indicates the updated rating.

17. The non-transitory computer storage medium of claim 16, further comprising:

determining an educational need of the user based on the monitoring; and presenting educational material to the user based on the determined educational need.

18. The non-transitory computer storage medium of claim 16, wherein the financial activities of the user includes a percentage of income that is saved.

19. The non-transitory computer storage medium of claim 16, further comprising:

recommending the user open a new financial account based on a comparison of financial accounts of the users and financial accounts common to the at least one different user.

20. The non-transitory computer storage medium of claim 16, further comprising:

determining an amount of income available to service debt of the user;

wherein monitoring the financial activities of the user includes monitoring the amount of income used to service debt; and wherein generating the rating of the user is further based on the monitoring the amount of income used to service debt and the amount of income available to service debt.

21. The non-transitory computer storage medium of claim 16, wherein the user-selected lifestyle archetype identifies at least one spending choice that is a voluntary financial decision.

* * * * *